US007337767B2

(12) United States Patent
Magarida et al.

(10) Patent No.: US 7,337,767 B2
(45) Date of Patent: Mar. 4, 2008

(54) DEVICE AND METHOD FOR CONTROLLING ENGINE

(75) Inventors: Naofumi Magarida, Susono (JP); Shinobu Ishiyama, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/594,217

(22) PCT Filed: Apr. 26, 2005

(86) PCT No.: PCT/JP2005/008387

§ 371 (c)(1),
(2), (4) Date: Sep. 26, 2006

(87) PCT Pub. No.: WO2005/103471

PCT Pub. Date: Nov. 3, 2005

(65) Prior Publication Data

US 2007/0213919 A1    Sep. 13, 2007

(30) Foreign Application Priority Data

Apr. 26, 2004    (JP) ............................. 2004-130315

(51) Int. Cl.
*F02D 41/38* (2006.01)
*F02D 41/40* (2006.01)
*F02D 45/00* (2006.01)

(52) U.S. Cl. ...................... 123/486; 123/299; 123/480; 701/103; 701/104

(58) Field of Classification Search ................ 123/299, 123/300, 446, 478, 480, 486, 501, 502; 701/102–105
See application file for complete search history.

(56) References Cited

U.S. PATENT DOCUMENTS

| 6,866,610 B2 | 3/2005 | Ito |
| 6,928,361 B2* | 8/2005 | Nakayama et al. ......... 701/104 |
| 2004/0267433 A1* | 12/2004 | Asano et al. ............... 701/104 |

FOREIGN PATENT DOCUMENTS

| JP | A 10-19117 | 1/1998 |
| JP | A 2001-241345 | 9/2001 |
| JP | A 2002-206447 | 7/2002 |
| JP | A 2002-293172 | 10/2002 |

* cited by examiner

*Primary Examiner*—T. M. Argenbright
(74) *Attorney, Agent, or Firm*—Oliff & Berridge, PLC

(57) ABSTRACT

In a device for controlling an engine, comprising combustion noise suppressor for suppressing combustion noise of a combustion chamber and controller for controlling the combustion noise suppressor, the device further includes control amount setter for setting a control amount of the combustion noise suppressor so that target combustion noise characteristics corresponding to a required amount of acceleration or deceleration exhibit a slower change in combustion noise than combustion noise characteristics corresponding to output characteristics of the engine over before and after acceleration or deceleration, wherein the controller controls the combustion noise suppressor according to the control amount set by the control amount setter. On the event of a rapid acceleration, a rapid change in the combustion noise in the initial stage of the acceleration is prevented to improve driving comfort.

7 Claims, 10 Drawing Sheets

DEVICE AND METHOD FOR CONTROLLING ENGINE

TECHNICAL FIELD

The present invention relates to a device and method for controlling an engine, and particularly to one adapted to prevent a rapid change in combustion noise.

BACKGROUND ART

Combustion noise characteristics of an engine are said to generally correspond to an output, which is a product of torque and speed. That is to say, as shown in FIG. 9, output contours and combustion noise contours of an engine on a speed-torque plane, i.e., constant-output lines Pp and constant-combustion-noise lines Cp correspond to each other within a predetermined range, i.e., virtually overlap with each other with a generally common peak point existing at central sides of the approximately arc-shaped constant-output lines Pp and constant-combustion-noise lines Cp, thus providing substantially similar characteristics.

On the other hand, in a vehicle equipped for example with manual transmission means, an operating locus Dp when an accelerator pedal is depressed without any gear shift during driving moves in such a way that first the torque increases rapidly and then the speed increases, as shown in FIG. 9.

In this case, combustion noise increases rapidly in a short time in an initial stage of the acceleration as surrounded by an ellipse in FIG. 10, which may impair driving comfort depending on the degree of the acceleration.

As a technique to prevent combustion noise, a pilot injection is known, in which prior to a main injection, a trace amount of fuel is preliminarily charged. According to this pilot injection, a trace amount of fuel preliminarily charged first burns to be a pilot burner, so that fuel ignitability in the main injection is improved and an initial combustion in the main injection becomes slow. As a result, an explosive combustion due to an ignition delay is avoided and accordingly the combustion noise of the engine can be suppressed.

On the other hand, since performing a pilot injection in a high-load and high-speed range or the like makes it easier to produce black smoke, it is necessary to stop the pilot injection at any point of time during output increase.

[Patent Document 1] Japanese Patent Application Laid-open No. 2002-206447

However, if the stop of the pilot injection is carried out concurrently in all cylinders, the combustion noise rapidly increases and this brings discomfort to a driver, thus impairing driving comfort. To deal with this problem, Patent Document 1 discloses the following technique: an operating range determined by speed and torque is divided into two ranges, i.e., an operating range requiring a pilot injection and an operating range requiring no pilot injection, and at the transition from the operating range requiring a pilot injection to the operating range requiring no pilot injection, the pilot injection is stopped at a different timing from each other cylinder to prevent a rapid increase of combustion noise.

With the technology described therein, however, since the pilot injection is performed uniformly across a predetermined speed-torque range, the rapid change of combustion noise at a rapid acceleration or the like still occurs, which may impair driving comfort depending on the degree of the acceleration.

It is therefore an object of the present invention to prevent a rapid change of combustion noise in a rapid operation for improving driving comfort.

DISCLOSURE OF THE INVENTION

The present invention provides a device for controlling an engine comprising combustion noise suppression means for suppressing combustion noise of a combustion chamber and control means for controlling the combustion noise suppression means, characterized in that the device further includes control amount setting means for setting a control amount of the combustion noise suppression means so that target combustion noise characteristics corresponding to a required amount of acceleration or deceleration exhibit a slower change in combustion noise than combustion noise characteristics corresponding to output characteristics of the engine over before and after acceleration or deceleration, and the control means controls the combustion noise suppression means according to the control amount set by the control amount setting means.

In the present invention, the control amount setting means sets a control amount of the combustion noise suppression means so that the target combustion noise characteristics corresponding to the required amount of acceleration or deceleration exhibit a slower change in combustion noise than the combustion noise characteristics corresponding to the output characteristics of the engine over before and after acceleration or deceleration. The control means controls the combustion noise suppression means according to the set control amount. Therefore, the present invention can prevent a rapid change in combustion noise on the event of a rapid acceleration or the like to improve driving comfort.

In one preferred embodiment of the present invention, the engine is connected to manual transmission means, and the target combustion noise characteristics are set so that constant-combustion-noise lines which represent on a coordinate plane with the speed and torque of the engine being coordinate axes distribution of combustion noise values of the engine within a predetermined range on the coordinate plane, provide a smaller absolute value of a speed variation relative to a torque variation from any point on the coordinate plane than constant-output lines which represent on the coordinate plane distribution of output values of the engine within the predetermined range.

In this embodiment, the target combustion noise characteristics are set so that constant-combustion-noise lines C1 which represent distribution of combustion noise values of an engine on a coordinate plane with the speed and torque of the engine being coordinate axes provide a smaller increment of speed relative to a change from any point on the coordinate plane to a torque increase side than constant-output lines P1 which represent distribution of output values of the engine on the same coordinate plane, as shown in FIG. 2. To put it another way, the target combustion noise characteristics are set so that the constant-combustion-noise lines C1 provide a smaller absolute value of a speed variation relative to a torque variation from any point on the coordinate plane than the constant-output lines P1, i.e., the constant-combustion-noise lines C1 being the target combustion noise characteristics are close to "downward-sloping curves" or "vertical stripes" compared to the constant-output lines P1. As described above, the constant-output lines P1 generally overlap with the constant-combustion-noise lines Cp (refer to FIG. 9) before improvement according to the present invention, whereas in a vehicle equipped with manual transmission means, an operating locus D1 of the engine moves in such a way that first the torque increases rapidly in the initial stage and then the speed increases as mentioned above. Accordingly, setting the control amount so as to obtain the target combustion noise characteristics as in the present embodiment allows time characteristics CL1 (refer to FIG. 4) of the target combustion noise when the operating locus D1 is traced to have a decreased slope in the initial stage and to exhibit a slower change in its entirety. Therefore, control of the combustion noise suppression means by the control means according to such control amount setting enables the present invention to achieve the desired effect in a simple configuration.

In another preferred embodiment of the present invention, the engine is connected to automatic transmission means, and the target combustion noise characteristics are set so that constant-combustion-noise lines, which represent on a coordinate plane with the speed and torque of the engine being coordinate axes distribution of combustion noise values of the engine within a predetermined range on the coordinate plane, provide a larger absolute value of a speed variation relative to a torque variation from any point on the coordinate plane than constant-output lines which represent on the coordinate plane distribution of output values of the engine within the predetermined range.

In this embodiment, the target combustion noise characteristics are set so that constant-combustion-noise lines, which represent distribution of combustion noise values of an engine on the coordinate plane with the speed and torque of the engine being coordinate axes plane, provide a larger increment of the speed relative to a change from any point on the coordinate plane to a torque increase side than constant-output lines which represent distribution of output values of the engine on the same coordinate, as shown in FIG. 6. To put it another way, the target combustion noise characteristics are set so that the constant-combustion-noise lines C2 provide a larger absolute value of a speed variation relative to a torque variation from any point on the coordinate plane than the constant-output lines, i.e., the constant-combustion-noise lines C2 being the target combustion noise characteristics are close to "upward-sloping curves" or "horizontal stripes" compared to the constant-output lines. As described above, the constant-output lines generally overlap with the constant-combustion-noise lines Cp (refer to FIG. 9) before improvement according to the present invention, whereas in a vehicle equipped with automatic transmission means, as a result of engine control in cooperation with the automatic transmission means to realize driving as required by input with optimum fuel consumption, an operating locus D2 of the engine is normally set so that first the speed increases rapidly in the initial stage and then the torque increases. Accordingly, setting the control amount so as to obtain the target combustion noise characteristics as in the present embodiment allows time characteristics CL2 (refer to FIG. 8) of the target combustion noise when the operating locus D2 is traced to have an increased slope in the initial stage, followed by a decreased slope and to exhibit a slower change in its entirety. Therefore, control of the combustion noise suppression means by the control means according to such control amount setting enables the present invention to achieve the desired effect in a simple configuration.

In another preferred embodiment of the present invention, the predetermined range is such that the speed and torque of the engine are both under the respective predetermined values.

A rapid change in combustion noise at the time of a rapid operation becomes a problem mainly in a low-speed and low-torque range. Therefore, defining such a range that provides a predetermined relationship between the constant-output lines and the constant-combustion-noise lines as the target combustion noise on the coordinate plane with speed and torque of the engine as coordinate axes as a range where the speed and torque of the engine are both under the respective predetermined values, as in the present embodiment, enables advantageous effect of the present invention to be achieved within the scope thereof.

Another preferred embodiment of the present invention further includes required output calculation means for calculating a required output based on the required amount of acceleration or deceleration, transition time calculation means for calculating transition time before the required output is reached, judgment means for judging whether a difference of a current output and the required output equals to or is greater than a predetermined value, and correction means for correcting the control amount based on the transition time so that a change in the combustion noise is slower if the difference equals to or is greater than the predetermined value.

According to the present embodiment, when the required output calculation means calculates a required output based on the required amount of acceleration or deceleration, the transition time calculation means calculates transition time before the required output is reached. The judgment means then judges whether a difference of a current output and the required output equals to or is greater than a predetermined value, and if the difference equals to or is greater than the predetermined value, the correction means corrects the control amount based on the transition time so that a change in the combustion noise is slower (symbol CL2a in FIG. 8). Therefore, in the present embodiment, a rapid change in combustion noise can be more effectively prevented on the event of a driver's rapid operation such as a rapid acceleration.

Another preferred embodiment of the present invention is a method comprising a setting step of setting a control amount of combustion noise suppression means for suppressing combustion noise of a combustion chamber, said setting step sets, in case of a vehicle equipped with manual transmission means, the control amount so that constant-combustion-noise lines, which represent on a coordinate plane with the speed and torque of the engine being coordinate axes distribution of combustion noise values of the engine within a predetermined range on the coordinate plane, provide a smaller absolute value of a speed variation relative to a torque variation from any point on the coordinate plane than constant-output lines which represent on the coordinate plane distribution of output values of the engine within the predetermined range, and said setting step sets, in case of a vehicle equipped with automatic transmission means, the control amount so that the constant-combustion-noise lines provide a larger absolute value of a speed change relative to a torque variation from any point on the coordinate plane than the constant-output lines, and a control step of controlling the combustion noise suppression means according to the set control amount.

According to the present embodiment, for a vehicle equipped with manual transmission means, the control amount is set so that the constant-combustion-noise lines being the target combustion noise characteristics provide a smaller increment of speed relative to a change to a torque increase side than the constant-output lines, and for a vehicle equipped with automatic transmission means, the control amount is set so that the constant-combustion-noise lines as the target combustion noise characteristics provide a larger increment of speed relative to a change to a torque increase side than the constant-output lines. In other words, for a vehicle equipped with manual transmission means, the control amount is set so that the constant-combustion-noise lines being the target combustion noise characteristics provide a smaller absolute value of a speed variation relative to a torque variation than the constant-output lines, and for a vehicle equipped with automatic transmission means, the control amount is set so that the constant-combustion-noise lines as the target combustion noise characteristics provide a larger absolute value of a speed variation relative to a torque variation than the constant-output lines. Therefore, in the present embodiment, setting corresponding to claims 2 and 3 can be easily done.

BEST MODE FOR CARRYING OUT THE INVENTION

Figure 1:
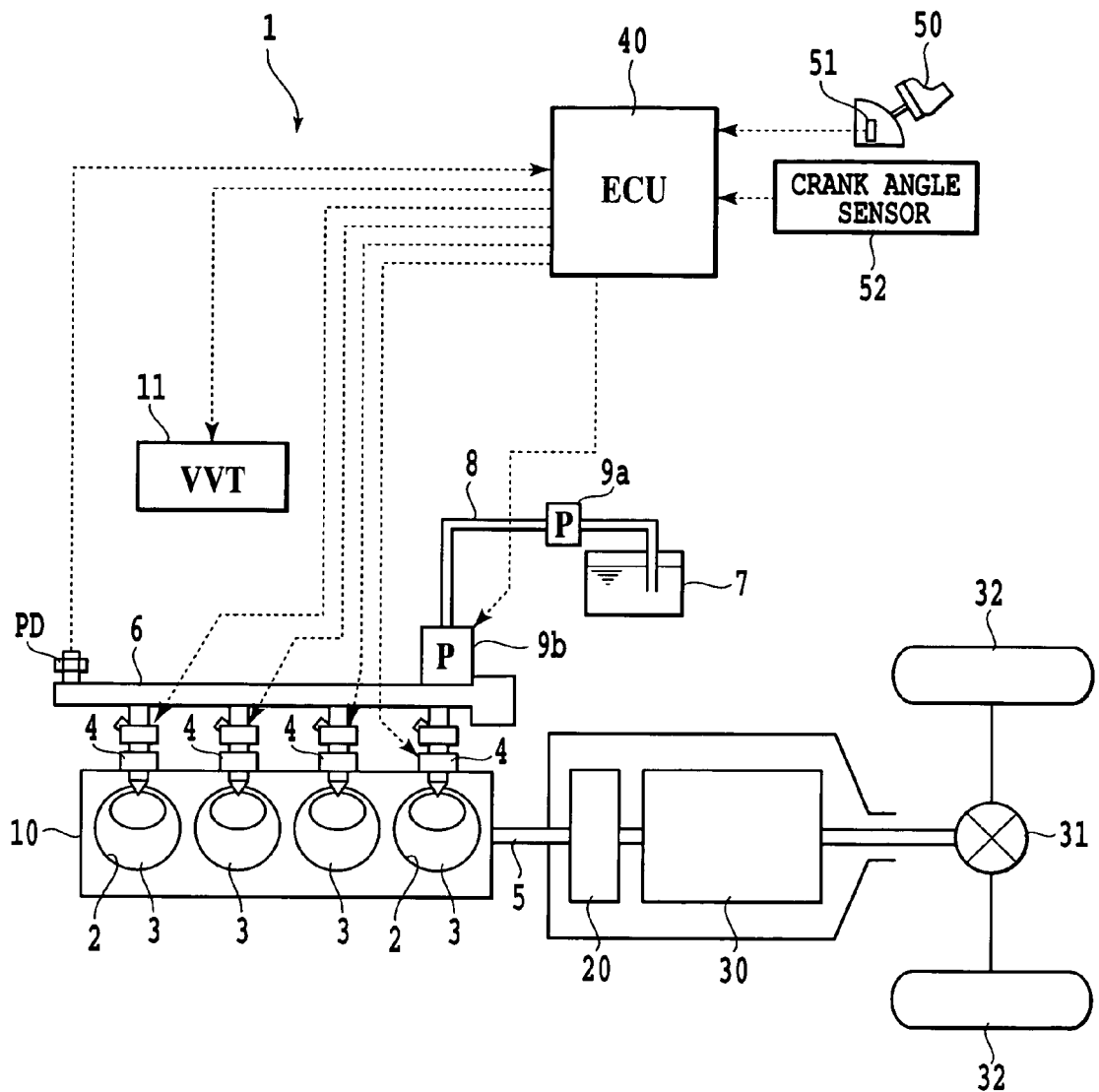
FIG. 1 is a schematic configuration diagram showing a first preferred embodiment of the present invention.

Preferred embodiments of the present invention will hereinafter be described. Referring to FIG. 1, a vehicle 1 according to a first preferred embodiment of the present invention is equipped with an engine 10, which is a cylinder direct injection internal combustion engine, such as a diesel engine or a gasoline engine. The engine 10 includes cylinders 2 formed inside a cylinder block, into which pistons 3 are slidably inserted. A combustion chamber is defined by the cylinders 2, the pistons 3, and a cylinder head block (not shown).

The pistons 3 are coupled to a crankshaft 5 by a connecting rod (not shown). Inside the cylinder head, an intake port and an exhaust port (not shown) are formed for each cylinder, in which an intake valve and an exhaust valve (not shown) are set respectively. A part of an intake passage upstream of the intake port is provided with a throttle valve or an intake throttle valve (not shown) controlled by a throttle actuator.

A fuel injection valve 4 is provided pointing to each of the cylinders 2. The fuel injection valves 4 are connected to a common delivery pipe 6 in a branched manner. A low-pressure pipe 8 connects the delivery pipe 6 to a fuel tank 7. The low-pressure pipe 8 is provided with a low-pressure pump 9a to send and supply fuel and a high-pressure pump 9b to pressurize the fuel to an injection pressure.

A camshaft to drive the intake and exhaust valves is provided with a variable valve timing mechanism (hereinafter referred to as VVT) 11. The VVT 11 is a mechanism to change a phase of rotation of the camshaft relative to rotation of the crankshaft 5 to continuously vary the valve timing of the intake and exhaust valves, and is driven by hydraulic pressure. The VVT 11 includes a number of duty-controllable solenoid valves to control itself.

The vehicle 1 of the present embodiment is equipped with a clutch 20 and a manual transmission 30. The clutch 20 connects or disconnects drive train depending on a driver's operation of a clutch pedal (not shown). The manual transmission 30 selectively engages one of a plurality of forward gears and a reverse gear depending on the driver's operation of a gearshift lever (not shown) to mechanically convert an input engine speed into a preferred output engine speed. Power from an output shaft of the manual transmission 30 is transmitted to a drive wheel 32 via a differential gear mechanism 31.

Operation control of the engine 10 is performed for example by control of opening time of the fuel injection valve 4 and control of throttle valve opening degree by an electronic control unit (hereinafter referred to as ECU) 40.

The ECU 40 comprises a CPU to perform various arithmetic operations, a ROM in which a control program and an initial value of each control variable are stored, a RAM in which the control program and data are temporarily retained, input and output ports, A/D and D/A converters, and a memory unit or the like, which are not shown in detail.

Inputted to the ECU 40 are each output signal from various sensors such as an accelerator opening sensor 51 disposed in connection with an accelerator pedal 50 operated by the driver, a crank angle sensor 52 disposed opposing a part of the crankshaft 5, and a fuel pressure sensor Pd disposed in the delivery pipe 6. Further, the foregoing fuel injection valve 4, VVT 11, throttle valve, and the like are controlled according to a control signal from the ECU 40.

In the memory unit of the ECU 40, a control amount map is preliminarily stored, in which control amounts (main injection quantity, and presence or absence, quantity and number of times of pilot injection) depending on a required amount of acceleration or deceleration (required rotational speed and required torque) are set.

In the present embodiment, as a combustion noise suppression means for suppressing combustion noise of the combustion chamber, the presence or absence of the aforementioned pilot injection, the quantity (pilot quantity), and the number of times (number of pilots) is controlled. With regard to a command signal given by the ECU 40 to the fuel injection valve 4, when no pilot injection is performed, only a main injection pulse 51 is output as indicated by pulse signal Pa shown in FIG. 3A. However, when a pilot injection is performed to prevent the combustion noise, a pilot injection pulse 52 is output prior to the main injection pulse 51 as indicated by pulse signal Pb shown in FIG. 3B. Further, when there is a high need to prevent the combustion noise, two or more pilot injections are performed (so-called multiple pilot injection) as indicated by pulse signal Pc shown in FIG. 3C. A greater number of pilot injections, i.e. a greater pilot numbers, basically bring about a better effect of suppressing the combustion noise, but there is a definite limit to the number of pilots because of mechanical restrictions of the fuel injection valve 4. Besides, a smaller injection quantity per pilot injection, i.e. a smaller pilot quantity, does not necessarily bring about a better effect of suppressing the combustion noise. In the control amount map in the present embodiment, taking into account these factors, the presence or absence of the pilot injection corresponding to the aforementioned target combustion noise characteristics, the pilot quantity, and the number of pilots are experimentally determined in advance for each speed-torque range, and as a result of use of the control amount map, the combustion noise characteristics as indicated by the constant-combustion-noise lines C1 in FIG. 2 are achieved.

Figure 2:
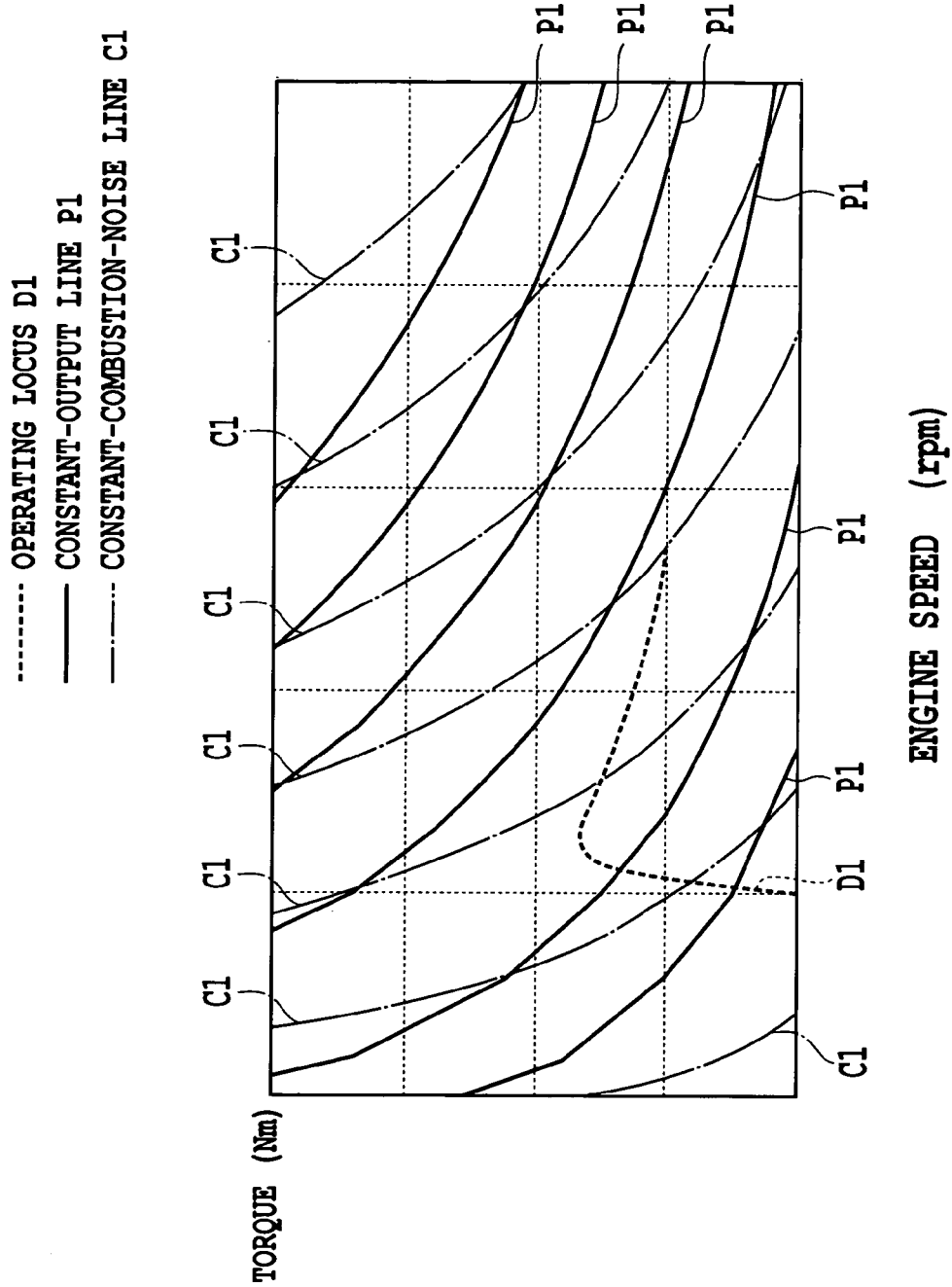
FIG. 2 is a set of graphs showing an operating locus, output characteristics, and combustion noise characteristics in the first preferred embodiment on a speed-torque plane.
Figure 3A:
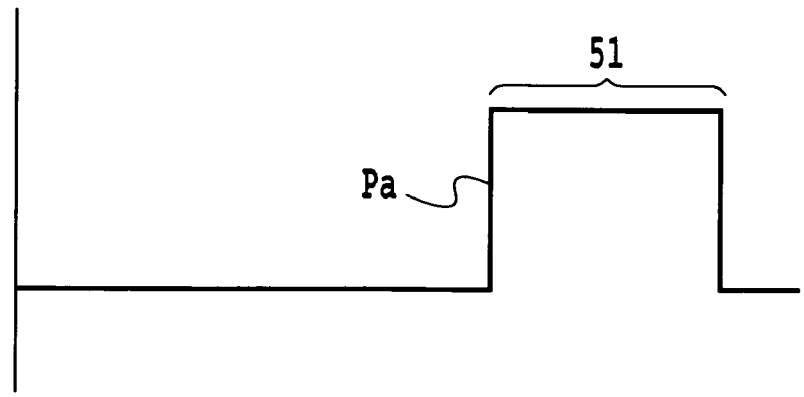
FIG. 3A is a timing chart showing a command pulse signal to a fuel injection valve when no pilot injection is performed.
Figure 3B:
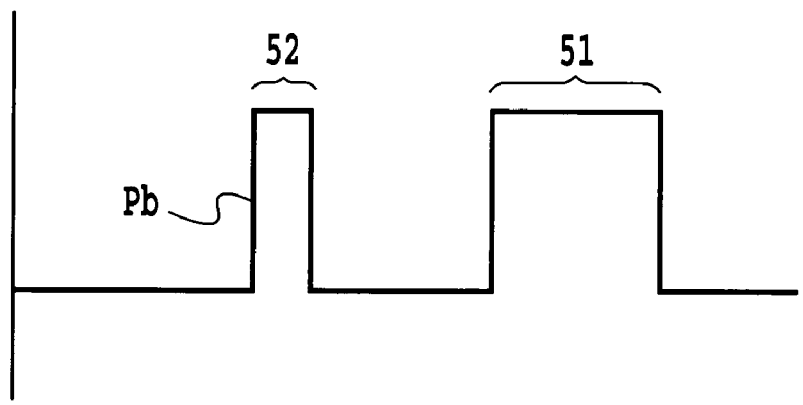
FIG. 3B is a timing chart showing a command pulse signal to a fuel injection valve when one pilot injection is performed.
Figure 3C:
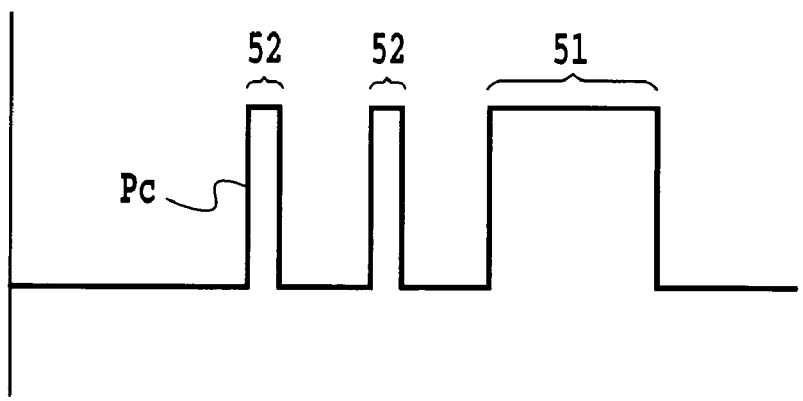
FIG. 3C is a timing chart showing a command pulse signal to a fuel injection valve when a plurality of pilot injections are performed.
Figure 9:
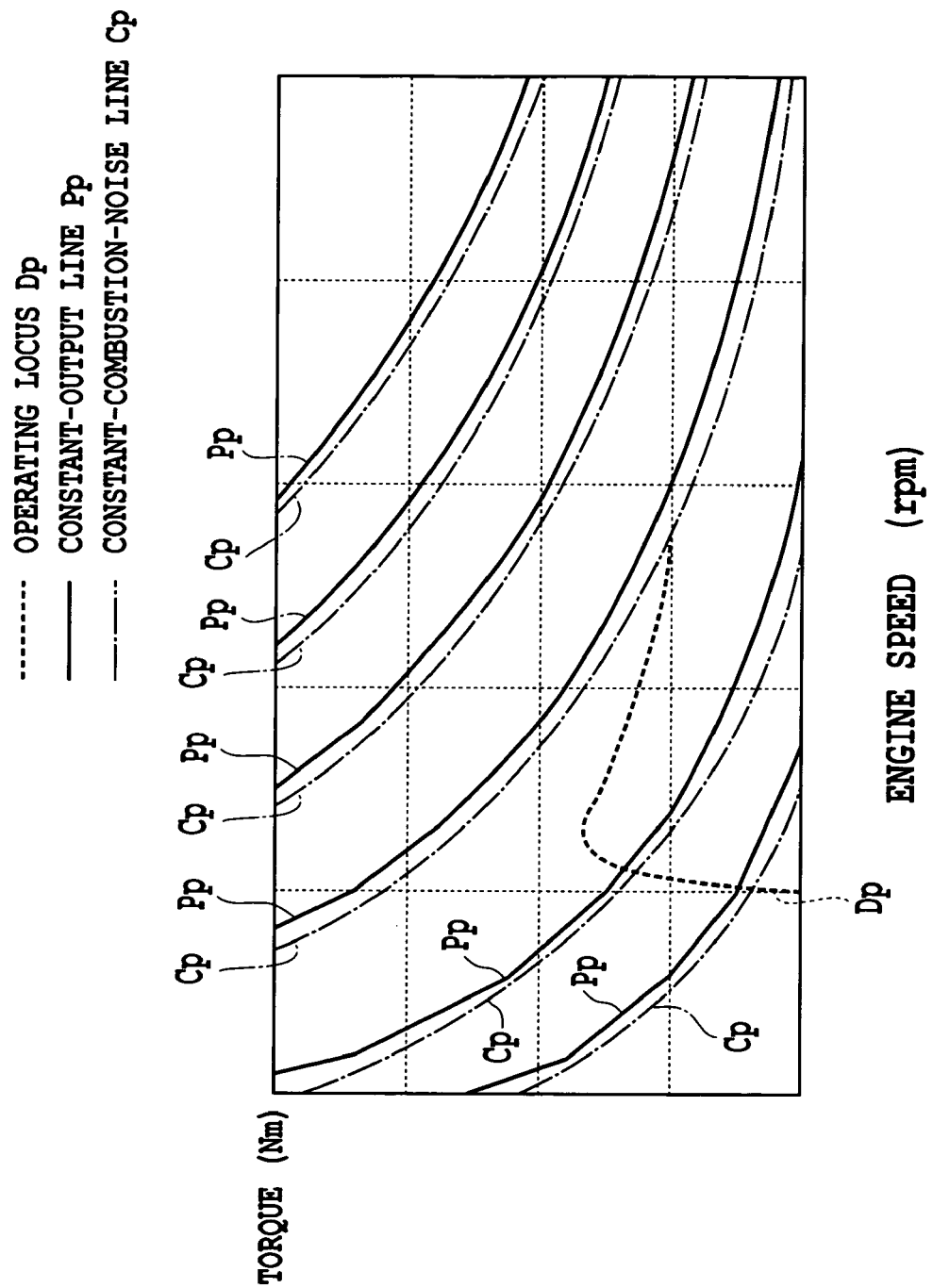
FIG. 9 is a set of graphs showing an operating locus, output characteristics, and combustion noise characteristics before improvement according to the present invention.
Figure 10:
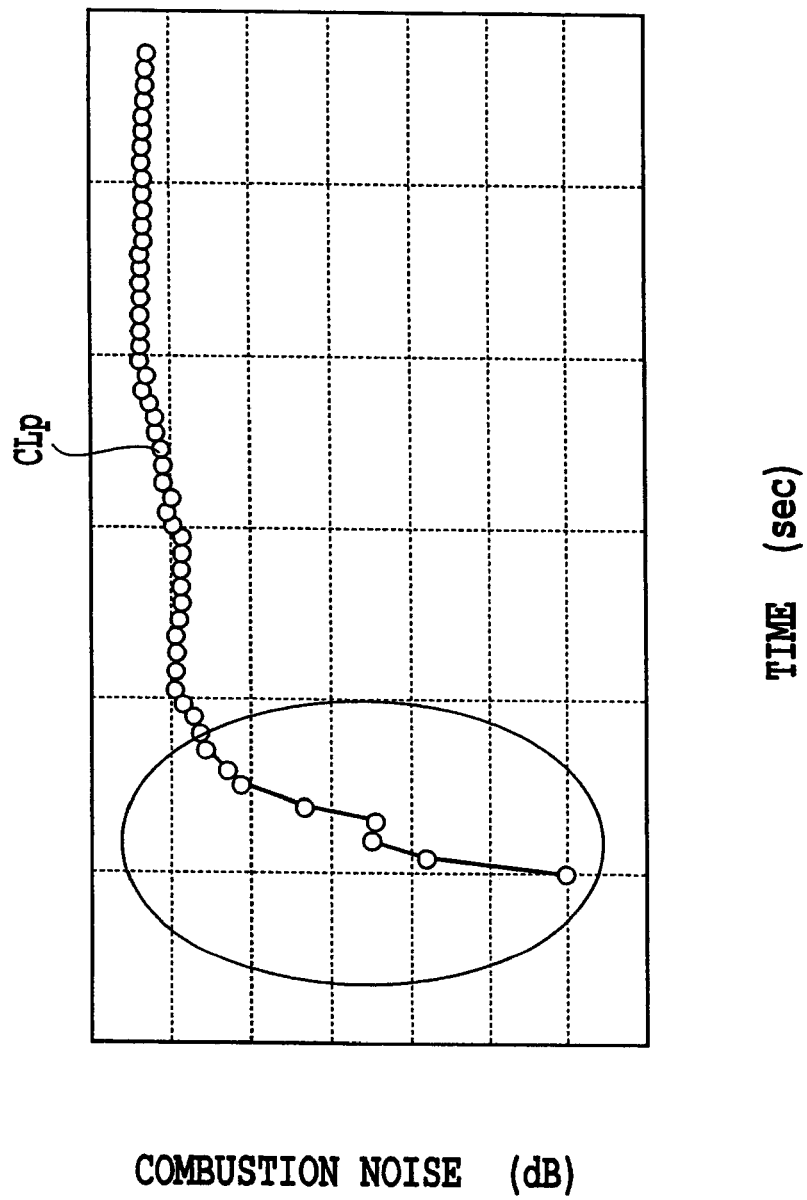
FIG. 10 is a graph showing time characteristics of target combustion noise before improvement according to the present invention.

The target combustion noise characteristics in the present embodiment are set as indicated by the constant-combustion-noise lines C1 in FIG. 2 so as to provide, on the coordinate plane with speed and torque of the engine as coordinate axes, a smaller absolute value of a speed variation relative to a torque variation from any point on the coordinate plane than the constant-output lines P1 which represent distribution of output values of the engine on the same coordinate plane. That is to say, the target combustion noise characteristics are set so that the constant-combustion-noise lines C1 are close to "downward-sloping curves" or "vertical stripes" compared to the constant-output lines P1. In other words, in the present embodiment, a control amount map is preliminarily prepared so that combustion noise, corresponding to a difference between the combustion noise level before combustion noise suppression as indicated by the constant-combustion-noise lines Cp shown in FIG. 9, which generally overlaps with the constant-output lines P1, and the combustion noise level indicated by the constant-combustion-noise lines C1 shown in FIG. 2, is suppressed by controlling the presence or absence of the pilot injection, the pilot quantity, and the number of pilots, and the fuel injection valve 4 is controlled according to this control amount map. Additionally, it should be noted that in FIG. 2, the approximately arc-shaped constant-output lines P1 and the constant-combustion-noise lines C1 each shows a higher value towards the center side thereof (upper right side in the figure).

In the first preferred embodiment configured as above, when the accelerator pedal 50 is depressed by the driver, the ECU 40 first prepares an operating locus up to an end of acceleration based on detected values from the accelerator opening sensor 51 and the crank angle sensor 52 as well as a current torque command value. Further, by reference to the control amount map based on the speed and torque of the operating locus, the ECU 40 calculates fuel injection quantity (the main injection quantity as well as the presence or absence of the aforementioned pilot injection, the pilot quantity, and the number of pilots at the respective points of time up to the end of the acceleration) at respective points of time up to the end of the acceleration in the operating locus. The ECU 40 then sends control outputs one after another to the fuel injection valves 4 according to the calculated main injection quantity, the presence or absence of the pilot injection, the pilot quantity, and the number of pilots.

In a vehicle equipped with a manual transmission means, the operating locus D1 of the engine moves in such a way that first the torque increases rapidly in the initial stage and then the speed increases, as shown in FIG. 2. Before the improvement according to the present invention, in that case, combustion noise also increases rapidly in the initial stage and then levels off as indicated by symbol CLp in FIG. 4. Accordingly, the combustion noise level increases rapidly in a short time in the initial stage (range enclosed by an ellipse in FIG. 2), which may impair driving comfort depending on the degree of the acceleration. In contrast, with the present embodiment, setting on the control amount map such control amount that achieves the target combustion noise characteristics indicated by the constant-combustion-noise lines C1 in FIG. 2 allows the time characteristics CL1 (refer to FIG. 4) of the target combustion noise to have a decreased slope in the initial stage and to exhibit a slower change in its entirety.

Figure 4:
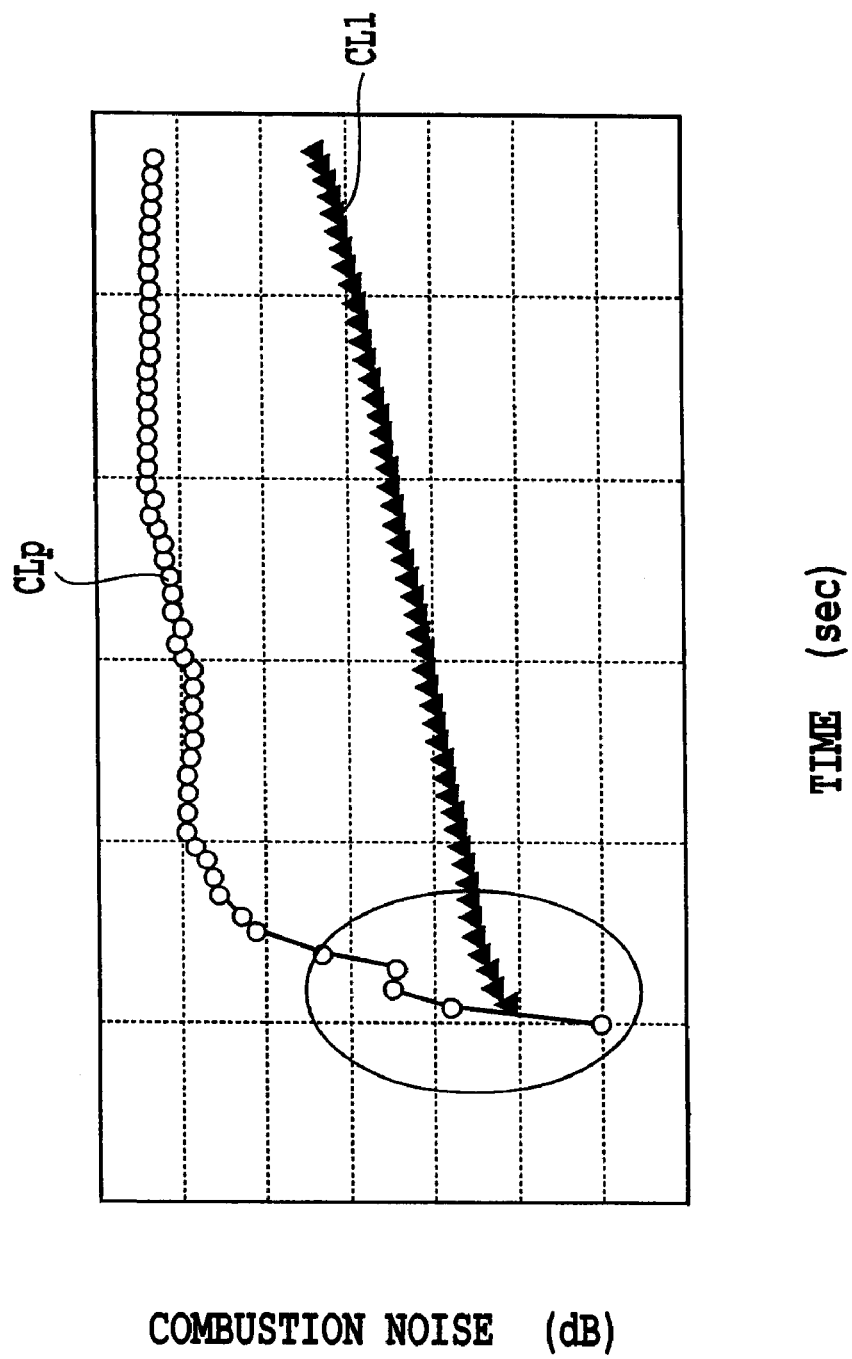
FIG. 4 is a set of graphs showing time characteristics of target combustion noises in the first preferred embodiment and before improvement according to the present invention.

As described above, in the present embodiment, since the control amount of the combustion noise suppression means is set on the control amount map so that a change in the combustion noise is slower than the combustion noise characteristics corresponding to the output characteristics of the engine 10 over before and after acceleration, and since the ECU 40 controls the fuel injection valve 4 according to this control amount map, a rapid change in combustion noise in such initial stage of the acceleration as surrounded by the ellipse in FIG. 4 can be prevented to improve driving comfort on the event of a rapid acceleration or the like.

Additionally, in the present embodiment, the target combustion noise characteristics are set so that the constant-combustion-noise lines C1 as the target combustion noise characteristics provide a smaller absolute value of a speed variation relative to a torque variation from any point on the coordinate plane than the constant-output lines P1 which represent distribution of output values of the engine on the same coordinate plane, as shown in FIG. 2. In other words, the target combustion noise characteristics are set so that the constant-combustion-noise lines C1 as the target combustion noise characteristics are close to "downward-sloping curves" or "vertical stripes" compared to the constant-output lines P1. The constant-output lines P1 are, as described above, substantially similar to the constant-combustion-noise lines Cp (refer to FIG. 9) before the improvement according to the present invention, whereas in the vehicle equipped with a manual transmission means, the operating locus D1 of the engine moves in such a way that first the torque increases rapidly in the initial stage and then the speed increases as described above. Accordingly, building the control amount map so as to obtain the target combustion noise characteristics as in the present embodiment allows the time characteristics CL1 (refer to FIG. 4) of the target combustion noise output in accordance with the operating locus D1 to have a decreased slope in the initial stage and to exhibit a slower change in its entirety. Therefore, control of the fuel injection valves 4 by the ECU 40 according to the control amount map enables the present invention to achieve the desired effect in a simple configuration.

Further, since the pilot injection causes for example black smoke, injection control such as retard of injection timing is performed to prevent any black smoke. In this case, fuel consumption may be increased. With the present embodiment, however, instead of always carrying out the pilot injection in a fixed quantity in a predetermined speed-torque range, the control amount is varied depending on acceleration operation velocity or amount of acceleration operation within a predetermined time, and consequently the fuel consumption can be thereby reduced without substantially impairing driving performance.

Figure 5:
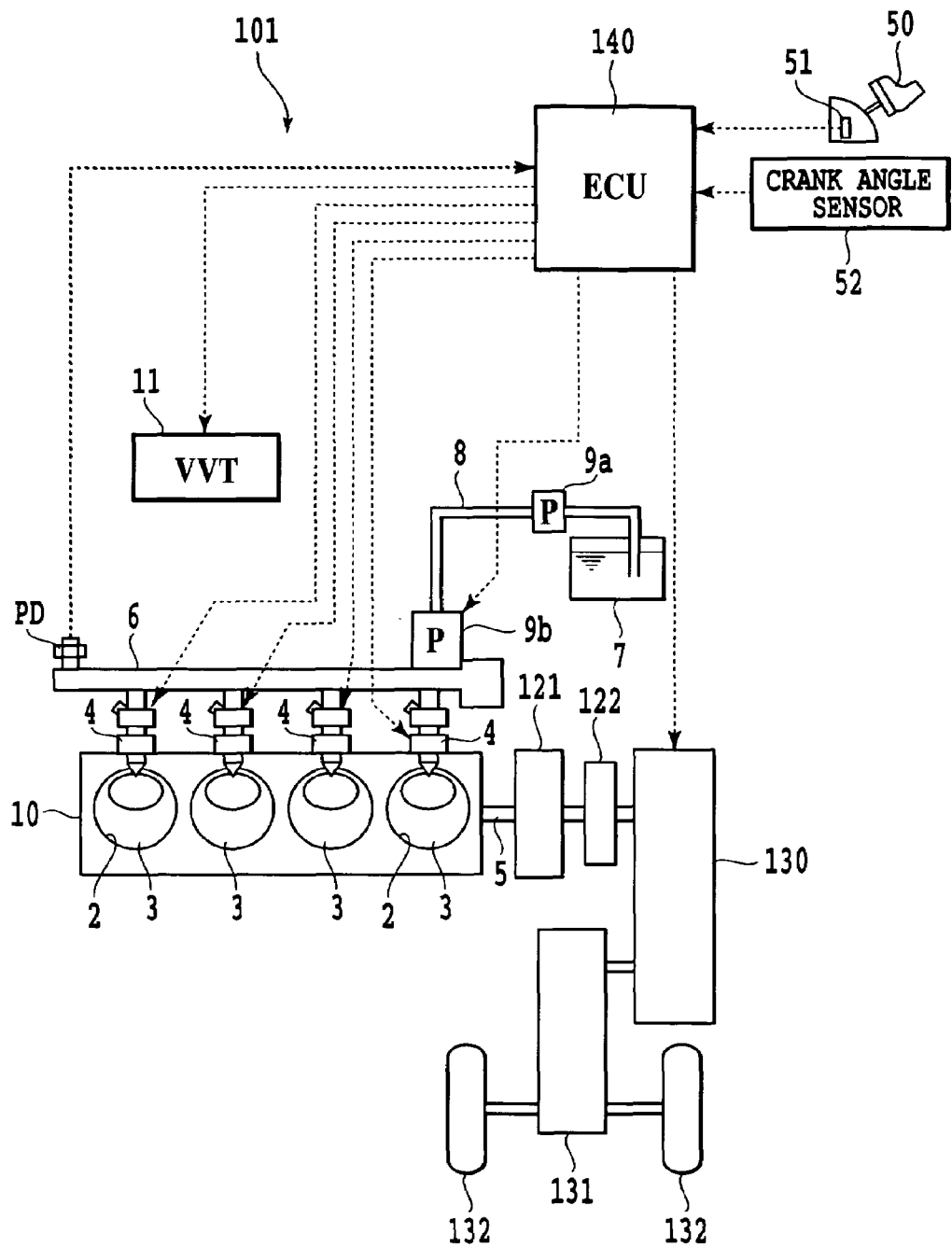
FIG. 5 is a schematic configuration diagram showing a second preferred embodiment of the present invention.

Next, a second preferred embodiment will be described. Referring to FIG. 5, a vehicle 101 according to the second preferred embodiment is equipped with a belt-type continuously-variable transmission (hereinafter referred to as CVT) 130 as a non-stage transmission.

Connected to the crankshaft 5 of the engine 10 as a drive source are a well-known hydraulic torque converter 121 which amplifies torque by the action of circulating oil to transmit it backward, a forward-reverse switching mechanism 122 comprising planetary gears and the like, and a well-known CVT 130 which varies a V-groove width of a pulley each at a drive side and a driven side by hydraulic pressure to vary an effective diameter of a driving belt looped around both pulleys for a speed change. An output shaft of the CVT 130 is transmitted to a drive wheel 132 via a deceleration mechanism 131 including a differential gear mechanism.

With the ECU 140 in the present embodiment, in order to operate the engine 10 in a range as close as possible to an optimum fuel consumption line (a predetermined high-torque range providing good specific fuel consumption), an optimum fuel consumption control is separately performed under the cooperation of the engine 10 and the CVT 130. As a result of this optimum fuel consumption control, engine speed and torque, and transmission ratio of the CVT 130 are set and realized so that an operating locus D2 when acceleration is requested is such that first the engine speed increases rapidly in the initial stage and then the torque increases as shown in FIG. 6.

In the memory unit of the ECU 140, a control amount map is preliminarily stored, in which control amounts (main injection quantity, and presence or absence, quantity and number of times of pilot injection) depending on a required amount of acceleration or deceleration (required speed and required torque) are set.

Also in the present embodiment, as a combustion noise suppression means for suppressing combustion noise of the combustion chamber, control of the presence or absence of the aforementioned pilot injection, the quantity (pilot quantity), and the number of times (number of pilots) is performed. In the control amount map in the present embodiment, the presence or absence of the pilot injection, the pilot quantity, and the number of pilots are experimentally pre-determined for each speed-torque range, and as a result of use of the control amount map, the combustion noise characteristics as indicated by the constant-combustion-noise lines C2 in FIG. 6 are achieved.

Figure 6:
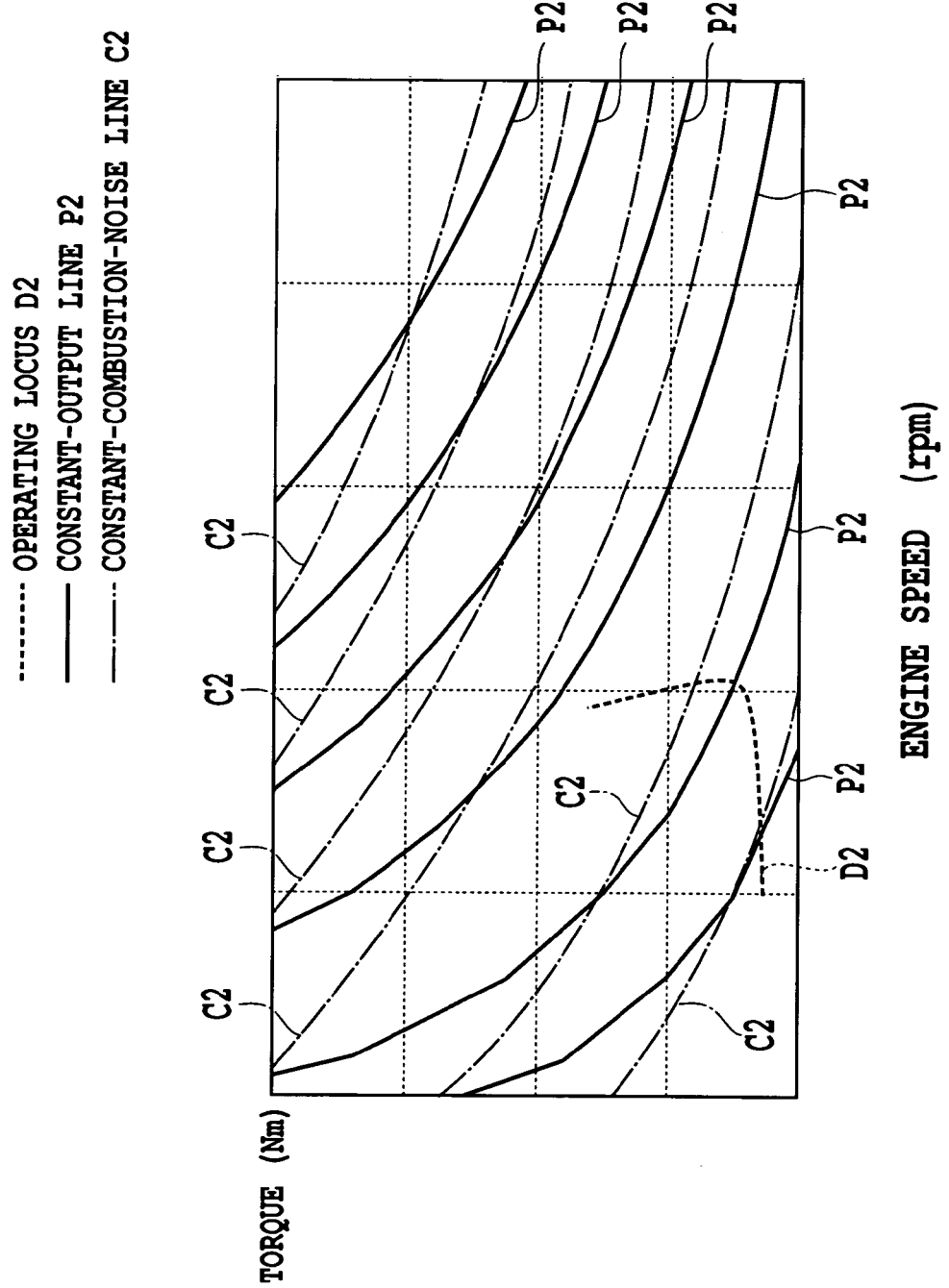
FIG. 6 is a set of graphs showing an operating locus, output characteristics, and combustion noise characteristics in the second preferred embodiment on a speed-torque plane.

The target combustion noise characteristics in the present embodiment are set so as to provide, on the coordinate plane with speed and torque of the engine as coordinate axes, a larger absolute value of a speed variation relative to a torque variation from any point on the coordinate plane than the constant-output lines P2 which represent distribution of output values of the engine on the same coordinate plane, as indicated by the constant-combustion-noise lines C2 in FIG. 6. In other words, the target combustion noise characteristics are set so that the constant-combustion-noise lines C2 are close to "upward-sloping curves" or "horizontal stripes" compared to the constant-output lines P2. To put it another way, in the present embodiment, a control amount map (not shown) is preliminarily prepared so that combustion noise corresponding to a difference between the combustion noise level before combustion noise suppression as indicated by the constant-combustion-noise lines Cp in FIG. 9, which generally overlaps with the constant-output lines P2, and the combustion noise level indicated by the constant-combustion-noise lines C2 shown in FIG. 6, is suppressed by controlling the presence or absence of the pilot injection, the pilot quantity, and the number of pilots, and the fuel injection valve 4 is controlled according to this control amount map. Additionally, it should be noted that in FIG. 6, the approximately arc-shaped constant-output lines P2 and the constant-combustion-noise lines C2 each shows a higher value towards the center side thereof (upper right side in the figure).

Figure 7:
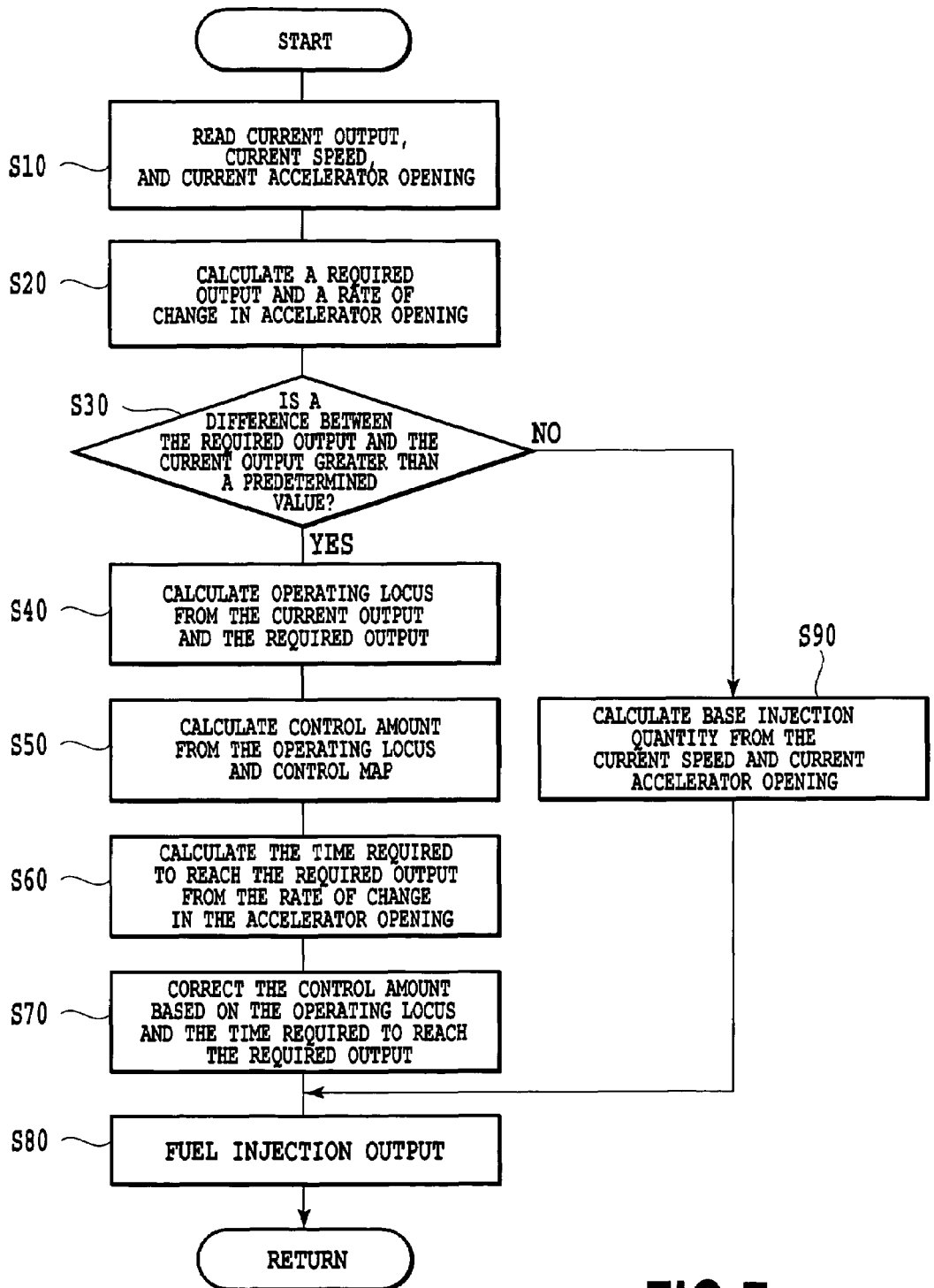
FIG. 7 is a flow chart showing one example of control in the second preferred embodiment.

Operation of the second preferred embodiment configured as above will now be described. FIG. 7 is a flow chart showing processes of the second preferred embodiment. First, a current output, a current speed, and a current accelerator opening are calculated by the ECU 140 based on detected values from the crank angle sensor 52, the accelerator opening sensor and the like, or read from a storage area on the ROM in the ECU 140 (S10). Secondly, a required output and a rate of change in accelerator opening are calculated (S20). The required output is calculated based on the current speed and the current accelerator opening. The rate of change in the accelerator opening is calculated based on a history of reading the current accelerator opening retained at intervals of a predetermined time.

Next, a judgment is made as to whether a difference between the required output and the current output exceeds a predetermined reference value (S30). If NO, the acceleration operation is judged as not being rapid, the process goes to step S90, wherein usual calculation of fuel injection quantity, i.e. calculation of base injection quantity based on the current speed and the current accelerator opening is carried out.

If YES in step S30, the amount of operation per the predetermined time is too much, i.e. the acceleration operation is judged to be rapid, and consequently calculation of a control amount by use of the control amount map and correction of the control variable based on the time required to reach the required output are carried out. Specifically, an operating locus is first calculated from the current output and the required output (S40). In this step, a starting point and an end point of the operating locus on the speed-torque plane are determined from the current output and the required output, and a path linking both points is determined by setting a target value for the aforementioned optimum fuel consumption control, i.e. by setting a target speed-torque value to operate the engine 10 in a range as close as possible to an optimum fuel consumption line. This optimum fuel consumption control allows the engine speed and torque, and the transmission ratio of the CVT 130 to be set so that the operating locus D2 follows a path where the engine speed first increases rapidly in the initial stage and then the torque increases as shown in FIG. 6.

Next, the control amount is calculated based on the calculated operating locus D2 and the control amount map (S50). In this step, the control amount map is referenced using as an input variable a coordinate value indicating a position that a point corresponding to a next step on the operating locus D2 occupies on the speed-torque plane, and a value of the corresponding control amount (the presence or absence of the pilot injection, the pilot quantity, and the number of pilots) is read.

Figure 8:
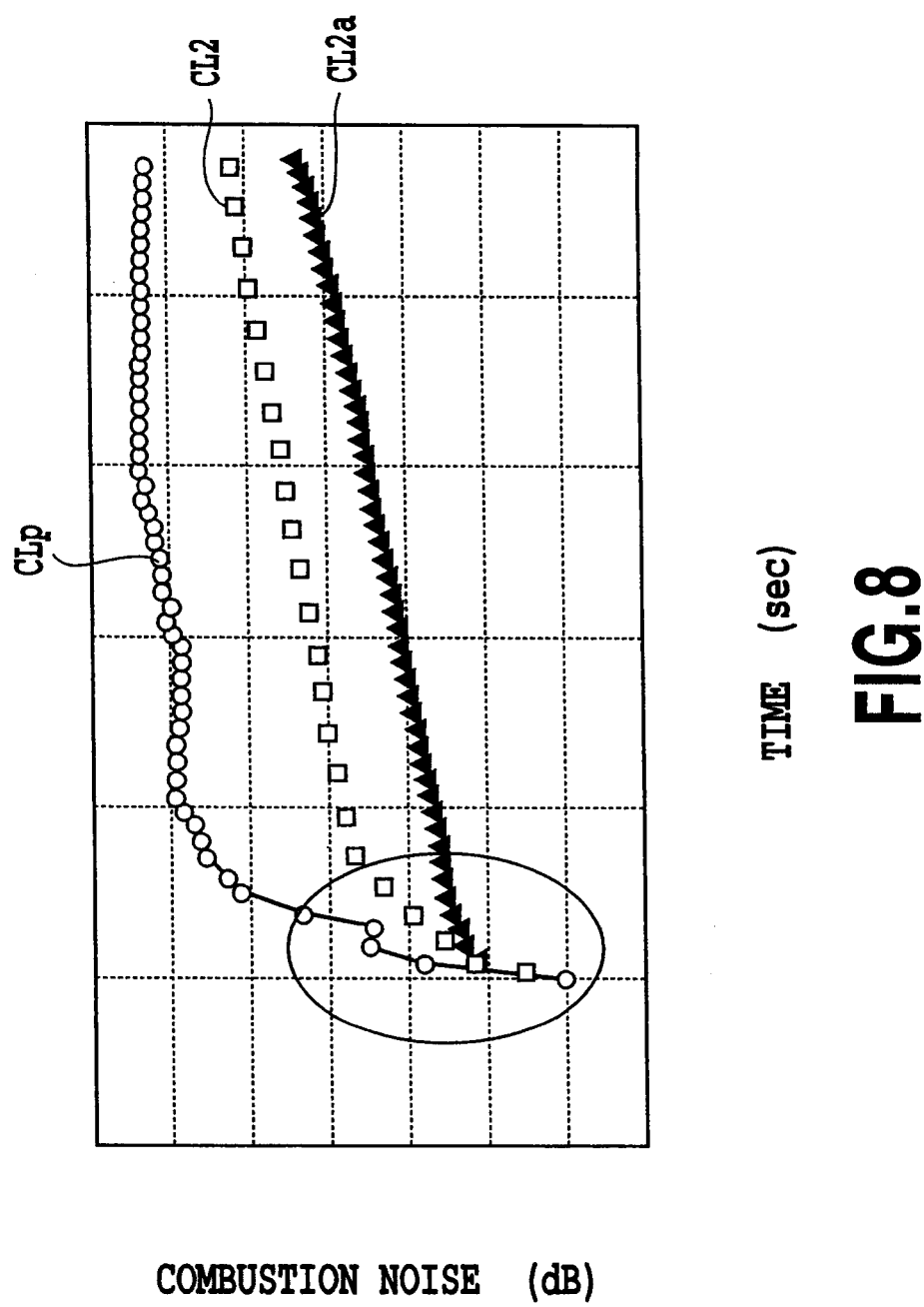
FIG. 8 is a set of graphs showing time characteristics of target combustion noises in the second preferred embodiment and before improvement according to the present invention.

Provided that the correction is carried out only based on the control amount calculated in step S50, the combustion noise would have such time characteristics as indicated for example by symbol CL2 in FIG. 8.

Then, based on the rate of change in the accelerator opening, the time required to reach the required output is calculated (S60). This calculation is performed by a predetermined function with the current speed, the current output, and the rate of change in the accelerator opening as input variables.

Next, the control amount calculated in step S50 is corrected based on the operating locus calculated in step S40 and the required time calculated in step S60 (S70). This correction is carried out using a predetermined map or function so that a change in the combustion noise is slower (i.e., the combustion noise varies more linearly from the starting point of the acceleration operation to a point of time when the required output is reached), as indicated as the combustion noise CL2a in FIG. 8. In the map or function, the amount of correction relative to the time required to reach the required output is set so that for instance the longer the required time is, the more gradually the amount of correction increases.

And then, a control output is sent to the fuel injection valve 4 by the ECU 40 in accordance with the base injection quantity calculated in step S90 or the control amount corrected in step S70 (S80).

In a vehicle equipped with an automatic transmission means, as a result of the aforementioned optimum fuel consumption control, the operating locus D2 of the engine moves in such a way that first the engine speed increases rapidly in the initial stage and then the torque increases, as shown in FIG. 6. Before the improvement according to the present invention, combustion noise also increases rapidly in the initial stage and then levels off as indicated by symbol CLp in FIG. 8. Accordingly, the combustion noise level increases rapidly in a short time in the initial stage (range surrounded by an ellipse in FIG. 8), which may impair driving comfort depending on the degree of the acceleration. In contrast, with the present embodiment, setting on the control amount map such control amount that achieves the target combustion noise characteristics indicated by the constant-combustion-noise lines C2 in FIG. 6 allows the time characteristics CL2 of the target combustion noise to have a decreased slope in the initial stage and to exhibit a slower change in its entirety.

As described above, in the present embodiment, the control amount of the combustion noise suppression means is set on the control amount map so that a change in the combustion noise is slower than the combustion noise characteristics corresponding to the output characteristics of the engine 10 over before and after acceleration, and since the ECU 140 controls the fuel injection valves 4 according to this control amount map. Thus, a rapid change in the combustion noise in such initial stage of the acceleration as surrounded by the ellipse in FIG. 8 can be reduced to improve driving comfort on the event of a rapid acceleration or the like.

Additionally, in the present embodiment, the constant-combustion-noise lines C2 as the target combustion noise characteristics are biased (i.e., closer to "upward-sloping curves" or "horizontal stripes") so that a torque value gradually increases with the engine speed, compared to the constant-combustion-noise lines Cp (refer to FIG. 9) determined from the engine speed and torque, as shown in FIG. 6. In the vehicle equipped with an automatic transmission means, as a result of fuel injection control in cooperation with the automatic transmission means to realize driving as required by input with optimum fuel consumption, the operating locus D2 of the engine is normally set so that first the engine speed increases rapidly in the initial stage and then the speed increases. Accordingly, building the control amount map so as to obtain the target combustion noise characteristics as in the present embodiment allows the time characteristics CL2 (refer to FIG. 8) of the target combustion noise when the operating locus D2 is traced to have a decreased slope in the initial stage and to exhibit a slower change as a whole. Therefore, control of the fuel injection valves 4 by the ECU 140 according to the control amount map enables the present invention to achieve the desired effect in a simple configuration.

Further, in the present embodiment, the time it takes to reach the required output calculated based on the required amount of acceleration or deceleration is calculated, and based on this transition time, the ECU 140 corrects the control amount so that a change in the combustion noise is slower (symbol CL2a in FIG. 8). Therefore, in the present embodiment, a rapid change in the combustion noise can be prevented more effectively on the event of a driver's rapid operation such as a rapid acceleration. Furthermore, since the control based on the control amount map and the correction thereof based on the transition time and the like are thus programmed to be performed when a difference between the required output and the current output equals to or is greater than a predetermined value, execution of these is avoided at times other than a rapid acceleration, and thereby deterioration of fuel economy can be prevented.

In the aforementioned embodiments, for the vehicle 1 equipped with the manual transmission 30, the combustion noise characteristics close to the "downward-sloping curves" or "vertical stripes" as shown in FIG. 2 are set, while for the vehicle 101 equipped with the CVT 130 as the automatic transmission, the combustion noise characteristics close to the "upward-sloping curves" or "horizontal stripes" as shown in FIG. 6 are set. Reversing thus the slope of each of the constant-combustion-noise lines C1, C2 of the combustion noise characteristics, depending on the transmission type, enables the desired combustion noise suppressing effect to be easily achieved or estimated. In other words, the present invention can be realized as a method of setting combustion noise characteristics or a control amount for combustion noise suppression using this phenomenon, or also as an engine control method including these.

In addition, in each of the aforementioned embodiments, the pilot injection is used as the combustion noise suppression means for suppressing combustion noise of the combustion chamber, and the presence or absence, quantity, and number of times thereof are controlled to control the combustion noise at any timing and level, but as the combustion noise suppression means in the present invention, other means capable of controlling combustion conditions or suppressing noise, such for example as selectively decreasing internal pressure of the delivery pipe 6 by controlling the high-pressure pump 9b, selectively decreasing boost pressure in a vehicle equipped with a variable nozzle turbocharger (a supercharger provided with movable nozzle vanes around a rotor of an exhaust-side turbine to make boost pressure variable), changing a valve timing or valve lift by controlling the VVT 11, and changing an ignition timing in an engine ignited by an ignition plug of e.g. a gasoline engine, and any combination of these can be used.

Further, in each of the aforementioned embodiments, the target combustion noise characteristics of the engine are designed to be set over the entire range related to the speed and torque thereof, but the target combustion noise characteristics in the present embodiment may be set only in a range where the speed and torque of the engine are both under the respective predetermined values. It is mainly in a low-speed and low-torque range that a rapid change in combustion noise at the time of a rapid operation becomes a problem. Thus, such a range that provides a predetermined relationship between the constant-output lines and the constant-combustion-noise lines as target combustion noise on a coordinate plane with speed and torque of an engine as coordinate axes does not necessarily have to be the entire range related to the speed and torque, and defining this as a range where a rapid change in combustion noise at the time of a rapid operation needs to be prevented, i.e. a range where the speed and torque of the engine are both under the respective predetermined values, enables the advantageous effect of the present invention to be achieved within the scope thereof.

Besides, in each of the aforementioned embodiments, the constant-combustion-noise lines C1, C2 as the target combustion noise characteristics are set so as to form "downward-sloping curves" (the first preferred embodiment) or "downward-sloping curves" (the second preferred embodiment) with respect to the constant-output lines P1, P2 on the speed-torque plane, and thus there is the advantage of being able to improve the combustion noise characteristics without any change in the output characteristics. However, the setting of the target combustion noise characteristics in the present invention may be done on the basis of the combustion noise characteristics corresponding to the constant-output lines or the constant-combustion-noise lines Cp thereof, and in this case, there is the advantage of being able to achieve the advantageous effect of the present invention in an engine where the coincidence or correlation between the output characteristics and the combustion noise characteristics is low (for reasons of other controls and the like).

Although there has been described in each of the aforementioned embodiments an example in which the present invention is applied to a rapid acceleration operation, the present invention is applicable to a rapid deceleration operation such as a downshift for engine braking.

Also, there has been described in each of the aforementioned embodiments an example in which the present invention is applied to a manual transmission vehicle (a vehicle with a manually shifted transmission) or a CVT-equipped vehicle, but the present invention is also applicable to a vehicle equipped with an automatic transmission having multiple shift steps or a non-stage transmission other than a belt-type CVT. Further, there has been described in each of the aforementioned embodiments examples in which the present invention is applied to the fuel-injected engine 10, but the present invention is applicable not only to the fuel-injected engine, but also to a carburetor-type or mixer-type engine, and such configuration belongs to the scope of the present invention.

INDUSTRIAL APPLICABILITY

The present invention can be applied to prevent a rapid change in combustion noise of an engine.

The invention claimed is:

1. A device for controlling an engine, comprising:
   combustion noise suppression means for suppressing combustion noise of a combustion chamber; and
   control means for controlling the combustion noise suppression means, wherein
   the engine is connected to manual transmission means,
   the device further includes control amount setting means for setting a control amount of the combustion noise suppression means so that target combustion noise characteristics corresponding to a required amount of acceleration or deceleration exhibit a slower change in combustion noise than combustion noise characteristics corresponding to output characteristics of the engine over before and after acceleration or deceleration,
   the target combustion noise characteristics being set so that constant-combustion-noise lines, which represent on a coordinate plane with the speed and torque of the engine being coordinate axes distribution of combustion noise values of the engine within a predetermined range on the coordinate plane, provide a smaller absolute value of a speed variation relative to a torque variation from any point on the coordinate plane than constant-output lines which represent on the coordinate plane distribution of output values of the engine within the predetermined range, and
   the control means controls the combustion noise suppression means according to the control amount set by the control amount setting means.

2. The device for controlling an engine according to claim 1, wherein
   the predetermined range is such that the speed and torque of the engine are both under the respective predetermined values.

3. The device for controlling an engine according to claim 1, further comprising:
   required output calculation means for calculating a required output based on the required amount of acceleration or deceleration;
   transition time calculating means for calculating transition time before the required output is reached;
   judgment means for judging whether a difference of a current output and the required output equals to or is greater than a predetermined value; and
   correction means for correcting the control amount based on the transition time so that a change in the combustion noise is slower if the difference equals to or is greater than the predetermined value.

4. A device for controlling an engine, comprising:
   combustion noise suppression means for suppressing combustion noise of a combustion chamber; and
   control means for controlling the combustion noise suppression means, wherein
   the engine is connected to automatic transmission means,
   the device further includes control amount setting means for setting a control amount of the combustion noise suppression means so that target combustion noise characteristics corresponding to a required amount of acceleration or deceleration exhibit a slower change in combustion noise than combustion noise characteristics corresponding to output characteristics of the engine over before and after acceleration or deceleration,
   the target combustion noise characteristics being set so that constant-combustion-noise lines, which represent on a coordinate plane with the speed and torque of the engine being coordinate axes distribution of combustion noise values of the engine within a predetermined range on the coordinate plane, provide a larger absolute value of a speed variation relative to a torque variation from any point on the coordinate plane than constant-output lines which represent on the coordinate plane distribution of output values of the engine within the predetermined range, and
   the control means controls the combustion noise suppression means according to the control amount set by the control amount setting means.

5. The device for controlling an engine according to claim 4, wherein
   the predetermined range is such that the speed and torque of the engine are both under the respective predetermined values.

6. The device for controlling an engine according to claim 4, further comprising:

required output calculation means for calculating a required output based on the required amount of acceleration or deceleration;

transition time calculating means for calculating transition time before the required output is reached;

judgment means for judging whether a difference of a current output and the required output equals to or is greater than a predetermined value; and correction means for correcting the control amount based on the transition time so that a change in the combustion noise is slower if the difference equals to or is greater than the predetermined output value.

7. A method for controlling an engine, comprising:

a setting step of setting a control amount of combustion noise suppression means for suppressing combustion noise of a combustion chamber, said setting step sets, in case of a vehicle equipped with manual transmission means, the control amount so that constant-combustion-noise lines, which represent on a coordinate plane with the speed and torque of the engine being coordinate axes distribution of combustion noise values of an engine within a predetermined range on the coordinate plane, provide a smaller absolute value of a speed variation relative to a torque variation from any point on the coordinate plane than constant-output lines which represent on the coordinate plane distribution of output values of the engine within the predetermined range, and said setting step sets, in case of a vehicle equipped with automatic transmission means, the control amount so that the constant-combustion-noise lines provide a larger absolute value of a speed variation relative to a torque change from any point on the coordinate plane than the constant-output lines; and a control step of controlling the combustion noise suppression means according to the set control amount.

* * * * *